(12) United States Patent
Becker

(10) Patent No.: US 12,515,728 B2
(45) Date of Patent: Jan. 6, 2026

(54) METHOD FOR PRODUCING AN ARRANGEMENT FOR A STEERING DEVICE

(71) Applicant: ZF FRIEDRICHSHAFEN AG, Friedrichshafen (DE)

(72) Inventor: Ingo Becker, Linnich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/716,254

(22) PCT Filed: Dec. 7, 2022

(86) PCT No.: PCT/EP2022/084789
§ 371 (c)(1),
(2) Date: Jun. 4, 2024

(87) PCT Pub. No.: WO2023/104885
PCT Pub. Date: Jun. 15, 2023

(65) Prior Publication Data
US 2025/0033687 A1    Jan. 30, 2025

(30) Foreign Application Priority Data
Dec. 7, 2021    (DE) ............... 10 2021 213 883.7

(51) Int. Cl.
*B62D 5/00* (2006.01)
*B62D 1/16* (2006.01)

(52) U.S. Cl.
CPC ............. *B62D 1/16* (2013.01); *B62D 5/003* (2013.01)

(58) Field of Classification Search
CPC .. B62D 1/20; B62D 5/003; B62D 1/16; G01L 3/04
See application file for complete search history.

(56) References Cited

U.S. PATENT DOCUMENTS 7,350,617 B2 * 4/2008 Lausser ............... B62D 6/10
                                                 180/444
8,100,774 B2 * 1/2012 Jung .................. F16D 3/06
                                                 464/162
(Continued)

FOREIGN PATENT DOCUMENTS

CN    113619677 A    * 11/2021
DE    102019109705 A1    10/2019
(Continued)

OTHER PUBLICATIONS

DE102019109705A1 machine translation from espacenet.com (Year: 2025).*
(Continued)

*Primary Examiner* — Paul N Dickson
*Assistant Examiner* — Maxwell L Meshaka
(74) *Attorney, Agent, or Firm* — Tarolli, Sundheim, Covell & Tummino LLP

(57) ABSTRACT

The invention relates to a method for producing an arrangement (1) for a steering device, said arrangement (1) comprising an input shaft (2) and an output shaft (3) and a torsion element (12) coupling the input shaft (2) and the output shaft (3), wherein, in the assembly of the arrangement (1), a coupling status is adopted in which the input shaft (2) is rotationally fixed to the output shaft (3) in an orientation defined by a coupling device (5), and the coupling status is released before the fixing of the torsion element (12) on the input shaft (2) and/or the output shaft (3).

13 Claims, 5 Drawing Sheets

(56) References Cited

U.S. PATENT DOCUMENTS

| | | | | |
|---|---|---|---|---|
| 9,114,833 | B2* | 8/2015 | Becker | B62D 15/0215 |
| 9,618,052 | B2* | 4/2017 | Miyake | F16C 3/023 |
| 11,148,713 | B2* | 10/2021 | Park | B62D 1/16 |
| 2006/0065473 | A1* | 3/2006 | Lausser | B62D 15/0215 |
| | | | | 180/444 |
| 2009/0124399 | A1* | 5/2009 | Jung | B62D 1/20 |
| | | | | 464/162 |
| 2013/0205917 | A1* | 8/2013 | Becker | B62D 15/0215 |
| | | | | 73/862.191 |
| 2015/0274205 | A1 | 10/2015 | Murakami et al. | |
| 2016/0069395 | A1* | 3/2016 | Miyake | B62D 1/16 |
| | | | | 464/162 |
| 2020/0108865 | A1* | 4/2020 | Park | F16D 3/76 |
| 2023/0258518 | A1* | 8/2023 | Becker | G01L 5/221 |
| | | | | 73/862.325 |
| 2025/0033687 | A1* | 1/2025 | Becker | G01L 3/04 |

FOREIGN PATENT DOCUMENTS

| | | | | |
|---|---|---|---|---|
| JP | 2002211422 A | | 7/2002 | |
| KR | 20070095681 A | * | 10/2007 | |
| KR | 20230174850 A | * | 12/2023 | |
| WO | 2011009169 A1 | | 1/2011 | |
| WO | WO-2012084133 A1 | * | 6/2012 | B23P 11/025 |
| WO | WO-2024009794 A1 | * | 1/2024 | |

OTHER PUBLICATIONS

International Search Report for International application No. PCT/EP2022/084789, with a mailing date of Mar. 24, 2023, 4 pages.
German Office Action for corresponding application No. 102021213883.7, dated Jul. 2, 2022, 10 pages.

* cited by examiner

METHOD FOR PRODUCING AN ARRANGEMENT FOR A STEERING DEVICE

RELATED APPLICATIONS

This application is a U.S. National Stage Application filed under 35 USC 371 claiming priority to Serial No. PCT/EP2022/084789, filed on 7 Dec. 2022; which claims priority from German Patent Application 10 2021 213 883.7, filed 7 Dec. 2021, the entireties of which are hereby incorporated herein by reference.

TECHNICAL FIELD

The invention relates to a method for producing an arrangement for a steering device, which arrangement has an input shaft and an output shaft and a torsion element coupling the input shaft and the output shaft.

BACKGROUND

Steering devices for motor vehicles that have above-described arrangements, comprising an input shaft, an output shaft and a torsion element, are known in principle from the prior art. Steering devices of this kind are intended, in particular, to enable determination of a torque, which torque a driver exerts on a steering element coupled to the input shaft. It is thereby possible to rotate the input shaft relative to the output shaft, with the torsion element being deformed. The deformation of the torsion element, e.g. by a certain angle, can then be used as a basis for determining the torque.

It is furthermore known that the input shaft and the output shaft cannot be rotated by an arbitrary amount relative to one another since this is blocked, e.g. mechanically. Blocking the ability for rotation between the input shaft and the output shaft ensures, on the one hand, that, if a fault occurs, the steerability of the motor vehicle is maintained, e.g. if the torsion element breaks, and, on the other hand, that the torsion element can be deformed only within a certain angular range.

This requires that the input shaft must be positioned precisely relative to the output shaft during the assembly of the arrangement. Since the input shaft is coupled to the output shaft via the torsion element, it is thus necessary to perform precise measurement of the alignments of the individual components in order to be able to center them. It is furthermore necessary here that the measured and set centering is not lost during the coupling of the components to one another.

For example, the torsion element is pressed into the output shaft, and the input shaft is then slipped over the torsion element. The preassembled arrangement must then be measured and aligned to enable the precise orientation between the input shaft and the output shaft to be established. During this process, even small deviations in one of the two directions of rotation must be avoided. The assembly method described thus requires complex devices for measuring the arrangement and for the precise alignment of the parts relative to one another. Moreover, carrying out measurement and centering is laborious and time-consuming, and the achievable precision is in need of improvement.

SUMMARY

The object underlying the invention is that of indicating a better method for producing an arrangement for a steering device.

The object is achieved by means of a method having the features of claim 1. Advantageous developments form the subject matter of the dependent claims.

As described, the invention relates to a method for producing an arrangement for a steering device, in particular a steering device of a motor vehicle. The arrangement has an input shaft and an output shaft, wherein the input shaft is coupled to the output shaft via a torsion element. The coupling of the input shaft to the output shaft via the torsion element is accomplished in the assembled position, i.e. the state in which the arrangement has been produced. To produce the arrangement, the individual components, in particular the input shaft, the output shaft and the torsion element can be present individually and coupled to one another by carrying out the method.

The invention is based on the insight that, in the assembly of the arrangement, a coupling state is adopted in which the input shaft is rotationally coupled to the output shaft in an orientation defined by a coupling device, and that the coupling state is released before the fixing of the torsion element on the input shaft and/or the output shaft. The coupling device described thus has the effect that the input shaft and the output shaft are oriented in a defined manner relative to one another and are rotationally coupled to one another. In other words, the coupling device is capable of establishing the desired orientation or alignment between the input shaft and the output shaft and of maintaining it in the coupling state.

The coupling device thus has the effect that it is possible to dispense with complex measurement and centering of the input shaft and the output shaft since it is possible by means of the coupling device to establish the coupling state, in which the input shaft and the output shaft have the desired orientation with respect to one another. In other words, to assemble the arrangement, the input shaft and the output shaft are coupled to one another or transferred to the coupling state by means of the coupling device. In the coupling state, the input shaft and the output shaft are thus not rotatable relative to one another but are rotationally coupled. Here, the coupling state is adopted temporarily for at least one process step during assembly and is then released again. In particular, the coupling state is released before the fixing of the torsion element on the input shaft and/or the output shaft. This ensures that, in the assembled, decoupled state, the input shaft is rotatable relative to the output shaft, namely by preloading or deforming the torsion element.

The coupling device thus advantageously makes it possible for the input shaft to be coupled to the output shaft via the coupling device, in this way achieving the desired orientation. Laborious measurement of the orientation, centering of the input shaft and the output shaft, and ensuring that the set orientation is not lost again, can therefore be eliminated. In particular, the coupling device can be produced as an integral part of the input shaft and/or output shaft and can thus be manufactured with the required precision. Complex external devices for measurement, setting and the like are therefore not required. Moreover, the orientation and assembly of the arrangement can be carried out significantly more quickly.

According to one variant of the method described, the coupling state can be released after the fixing of the torsion element on the input shaft or the output shaft and before the fixing of the torsion element on the output shaft or the input shaft, or the coupling state can be released before the fixing of the torsion element on the input shaft and the output shaft. In other words, it is possible to adopt the coupling state and to fix the torsion element either on the input shaft or the output shaft. Depending on which of the two components the torsion element is fixed first of all, the coupling state is released before the torsion element is connected to the other component in each case.

For example, the coupling state can be adopted and the torsion element connected to the input shaft. In this case, the coupling state is released, and the torsion element is then fixed to the output shaft. Alternatively, it is possible to adopt the coupling state and to connect the torsion element to the output shaft, to release the coupling state and then to establish a connection between the torsion element and the input shaft.

Another variant consists in adopting the coupling state in order to fix the orientation between the input shaft and the output shaft. The coupling state can then be released, while it must be ensured that the input shaft and the output shaft remain in the fixed orientation. The torsion element can then be attached both to the input shaft and to the output shaft. In principle, all conventional types of connection are possible for the connection between the torsion element, the input shaft and the output shaft. For example, the connection between the torsion element and the input shaft and output shaft can be established by pinning, knurling, screw fastening, adhesive bonding, welding or other types of connection. In the connected state, it must be ensured at all times that the input shaft can still be rotated relative to the output shaft, deforming the torsion element in the process.

As described, the coupling device is fundamentally designed to establish the coupling state, in which the input shaft and the output shaft have the defined orientation with respect to one another and a relative rotary movement between the input shaft and the output shaft is not possible or is prevented. The coupling state can be established and released again, in particular, by a relative movement between the input shaft and the output shaft. In particular, the relative movement can be an axial movement. A movement in the axial direction or axial movement is understood to mean a movement parallel to the axis of rotation of the input shaft and the output shaft. In the assembled state, the input shaft and the output shaft have the same axis of rotation or central axis. The coupling device can be designed in such a way that the coupling state can be established by an axial movement of the input shaft and the output shaft toward one another and released again by an axial movement away from one another. The movement in the axial direction thus enables the coupling device to establish coupling between the input shaft and the output shaft and to release this coupling again during a movement counter to the axial direction.

The method can furthermore envisage that the arrangement has a coupling device, wherein the coupling state is established by means of a first coupling element on the input shaft and of a second coupling element on the output shaft. In the configuration described, the coupling device can comprise a first coupling element and a second coupling element, which are formed on the input shaft and the output shaft, respectively. The coupling device can thereby ensure that, when the first coupling element engages in the second coupling element or vice versa, there is the desired centering between the input shaft and the output shaft. In other words, the input shaft is coupled to the output shaft and transferred to the coupling state, in which the first coupling element is coupled to the second coupling element.

Once the first coupling element is coupled to the second coupling element, the coupling state is established, and the input shaft and the output shaft are in the desired orientation. The two coupling elements therefore have a defined position on the input shaft and the output shaft. In particular, the coupling elements establish a positive coupling state. For example, one of the coupling elements is designed as a peg, and the other coupling element is designed as a recess corresponding to the latter. The peg can thus be inserted into the recess, but only when the orientation of the input shaft and the output shaft around the axis of rotation corresponds to the desired orientation. As already described, the coupling between the two coupling elements is preferably established by an axial movement and released again by an axial movement in the opposite direction.

The arrangement can furthermore have a securing device, which can be designed as a mechanical stop for the torsion angle that allows a rotary movement between the input shaft and the output shaft by a safety angle, which represents a maximum permissible angle of rotation, wherein the coupling state is set in such a way that the input shaft and the output shaft are positioned in the center of the safety angle relative to one another. The coupling state thus fixes the input shaft and the output shaft rotationally in an orientation which corresponds to the center of the safety angle. In other words, from the fixed orientation, the input shaft can be rotated by half the safety angle relative to the output shaft or vice versa. By way of example, the securing device can provide mechanical stops that are provided on the input shaft and/or the output shaft and allow rotation of the input shaft and of the output shaft from the center only up to half the maximum safety angle in each direction in the decoupled state.

The coupling device ensures that the desired orientation, namely in the center of the safety angle, is adopted. For this purpose, the input shaft is coupled to the output shaft via the coupling device. Thus, in the coupling state, the desired orientation is achieved, and it is therefore possible, for example, for the torsion element to be arranged on one of the two components, for the coupling state to be released and, while the desired orientation is retained, for the other component in each case likewise to be connected to the torsion element. In this case, it is possible, in particular, for the securing device to protect the torsion element if the safety angle selected is such that the torsion element is not damaged, e.g. is not over-twisted, even at the maximum safety angle. Furthermore, the securing device can ensure that the torque can be transmitted from the input shaft to the output shaft, even if the torsion element is damaged. If the torsion element breaks, for example, the input shaft can transmit torque to the output shaft via the stop of the securing device, thus ensuring that it is still possible to steer the motor vehicle despite the torsion element having been destroyed or damaged.

The method can furthermore be developed by inserting a bearing, in particular a needle bearing, between the input shaft and the output shaft. The function of the needle bearing is, for example, to prevent tilting between the input shaft and the output shaft. In addition, the friction between the input shaft and the output shaft when executing a steering movement can be reduced. As regards the sequence of assembly, it may be expedient to insert the bearing first, e.g. into the output shaft, and then to establish the coupling between the input shaft and the output shaft via the coupling device. Once the torsion element has been installed, e.g. with the input shaft or the output shaft, the coupling state can be released, and the connection to the other component in each case can be established using the torsion element.

As already described, the connection between the input shaft and the torsion element, and the connection between the output shaft and the torsion element, can be selected as desired. In the assembled state, the input shaft and the output shaft are each connected to the torsion element, in particular materially, positively or non-positively. Ultimately, any type of connection can be selected, e.g. adhesive bonding, welding, knurling or a pin, press-fitting or screw fastening.

During the installation of the torsion element, the torsion element can be fixed in the axial direction in a two-stage recess in the input shaft or the output shaft. Fundamentally, the sequence of assembly and direction of assembly in respect of the input shaft and the output shaft are reversible. When designing the input shaft and the output shaft, the ability for rotation between the input shaft and the output shaft in the assembled state should be ensured. Thus, the input shaft or the output shaft can have a two-stage recess, i.e. a recess which has recess portions that are arranged adjacent to one another in the axial direction and which have different diameters.

In particular, a first diameter is chosen so that a corresponding connecting portion of the torsion element can be inserted into the input shaft or the output shaft, i.e. into the recess. The connecting portion of the torsion element can be brought into contact with the second stage of the recess. In particular, the contact between the connecting portion of the torsion element and the second stage of the recess is established in the coupling state, in which the input shaft is coupled to the output shaft. A connection can then be established between the torsion element and the other component in each case, i.e. the output shaft or the input shaft, which does not have the two-stage recess, e.g. by pinning.

The coupling state can then be released, wherein the connecting portion of the torsion element is inserted into the second stage of the recess, e.g. pressed in. In particular, the connecting portion of the torsion element can have knurling or some other surface structuring.

In this case, the torsion element fixes the central position of the arrangement in the press-fitting process, while the coupling device is simultaneously released.

In addition, the invention relates to an arrangement for a steering device, which arrangement has an input shaft and an output shaft and a torsion element coupling the input shaft and the output shaft, wherein the arrangement has a coupling device, which is designed, during assembly, to establish a coupling state between the input shaft and the output shaft, in which state the input shaft is rotationally coupled to the output shaft in a defined orientation, and the coupling device is designed to release the coupling state before the fixing of the torsion element on the input shaft and/or the output shaft. The invention furthermore relates to a motor vehicle comprising a steering device having an arrangement of this kind.

All the advantages, details and features which have been described with reference to the method are fully transferable to the arrangement and to the motor vehicle.

BRIEF DESCRIPTION OF DRAWINGS

The invention is explained below by means of an exemplary embodiment with reference to the figures. The figures are schematic illustrations, and.

DESCRIPTION

Figure 1:
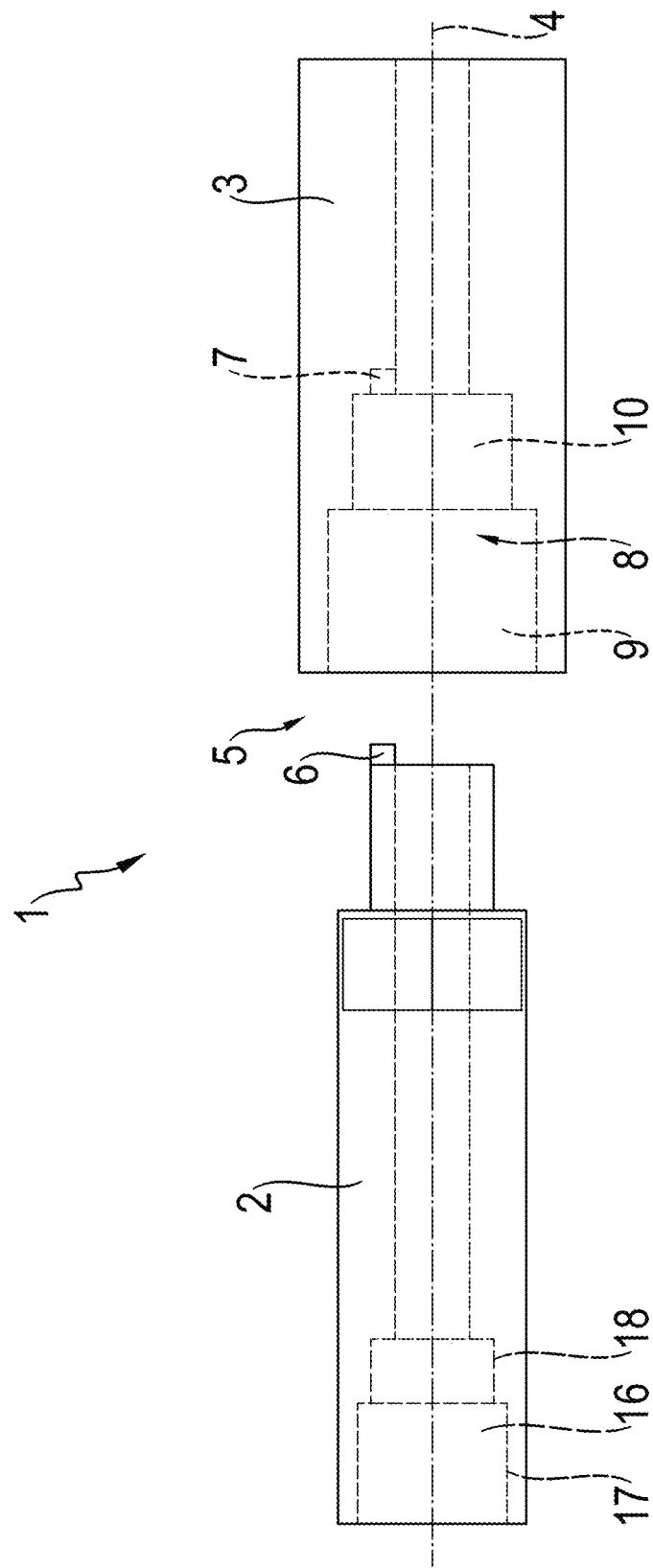
FIGS. 1-4 each show a longitudinal section through an arrangement for a steering device in various steps of a production method.

FIG. 1 shows a detail of an arrangement 1 for a steering device (not shown specifically) for a motor vehicle, wherein only an input shaft 2 and an output shaft 3 are shown in the illustration in FIG. 1. In the description which follows, the designations "input shaft" and "output shaft" are fundamentally interchangeable since they refer only to the input and output of the torque. The two components are correspondingly interchangeable or reversible, and therefore the output shaft could also be referred to as the input shaft and the input shaft could also be referred to as the output shaft, and the components could be arranged in the reverse order in the torque flow.

The input shaft 2 and the output shaft 3 are arranged on a common axis of rotation 4 and are arranged in a fundamentally rotatable manner with respect to the common axis of rotation 4. The arrangement 1 has a coupling device 5, which provides a first coupling element 6 and a second coupling element 7. If the coupling device 5 is in engagement, a coupling state is established in which the input shaft 2 and the output shaft 3 are coupled to one another in the circumferential direction, i.e. such that a relative rotation between the input shaft 2 and the output shaft 3 is blocked by the coupling device 5.

Fundamentally, the type of coupling implemented by the coupling device 5 is a matter of free choice. In the exemplary embodiment shown, a positive coupling is established, in which the first coupling element 6 is designed as a peg that projects from the input shaft 2 in the axial direction, and coupling element 7 is designed as a recess in the output shaft 3. As already described, the coupling device 5 can also be arranged the other way around, i.e. the first coupling element 6 is arranged on the output shaft 3 and the second coupling element 7 is arranged on the input shaft 2.

In this exemplary embodiment, the output shaft 3 has a two-stage socket 8, which comprises a first socket stage 9 and a second socket stage 10. The diameters of the two-stage socket 8 are matched to the geometry of the input shaft 2. A reverse arrangement, in which the output shaft 3 is inserted into the input shaft 2 can likewise be implemented.

Figure 2:
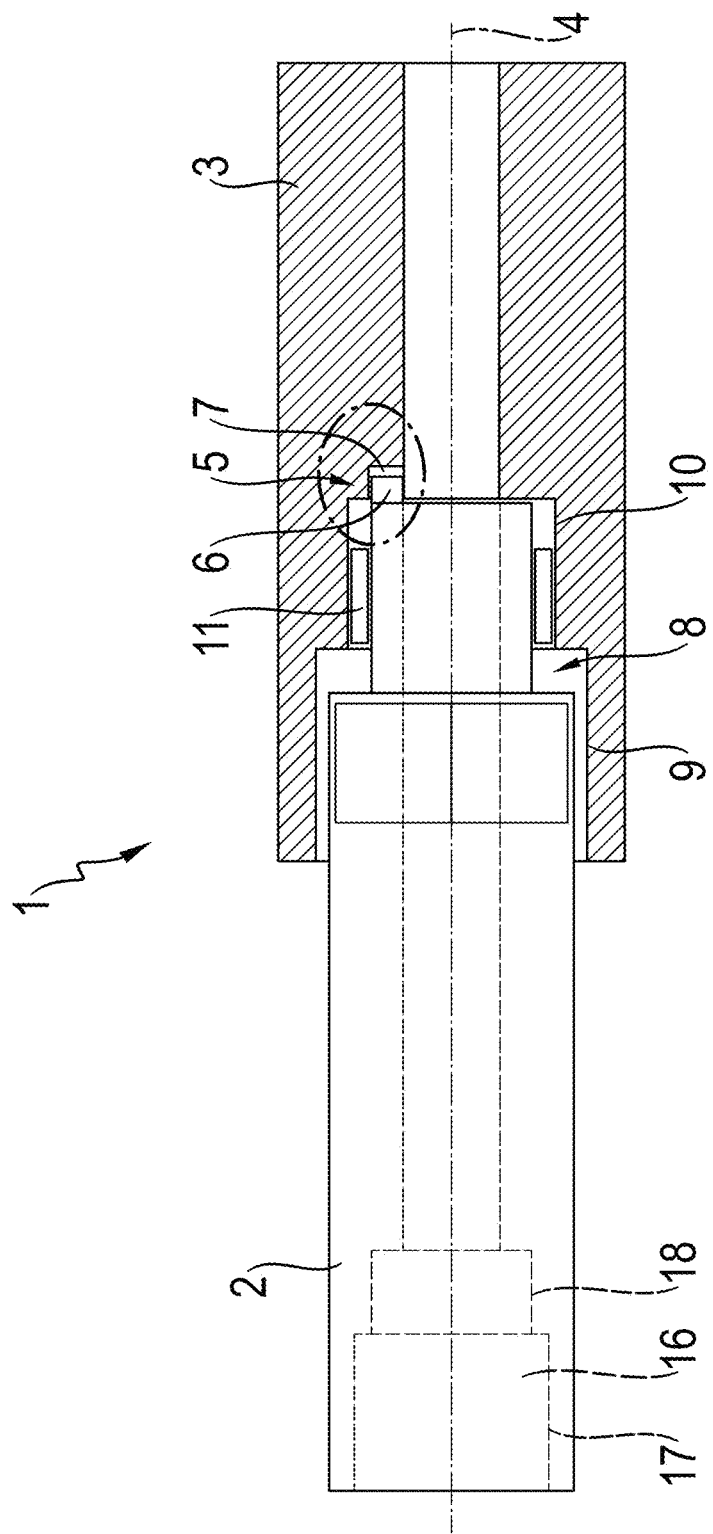

FIG. 2 shows the arrangement 1 in a further process step of an assembly method. In FIG. 2, a bearing 11, in particular a needle bearing, is inserted into the second socket stage 10 of the two-stage socket 8. Furthermore, the coupling state is established between the input shaft 2 and the output shaft 3 by the coupling device 5. This means that the first coupling element 6 engages in the second coupling element 7, and therefore there is rotationally fixed coupling between the input shaft 2 and the output shaft 3. Here, the arrangement of the two coupling elements 6, 7 on the input shaft 2 and the output shaft 3 is chosen in such a way that an orientation with respect to an angle of rotation corresponds in the coupling state to a desired orientation of the two elements with respect to one another.

Figure 3:
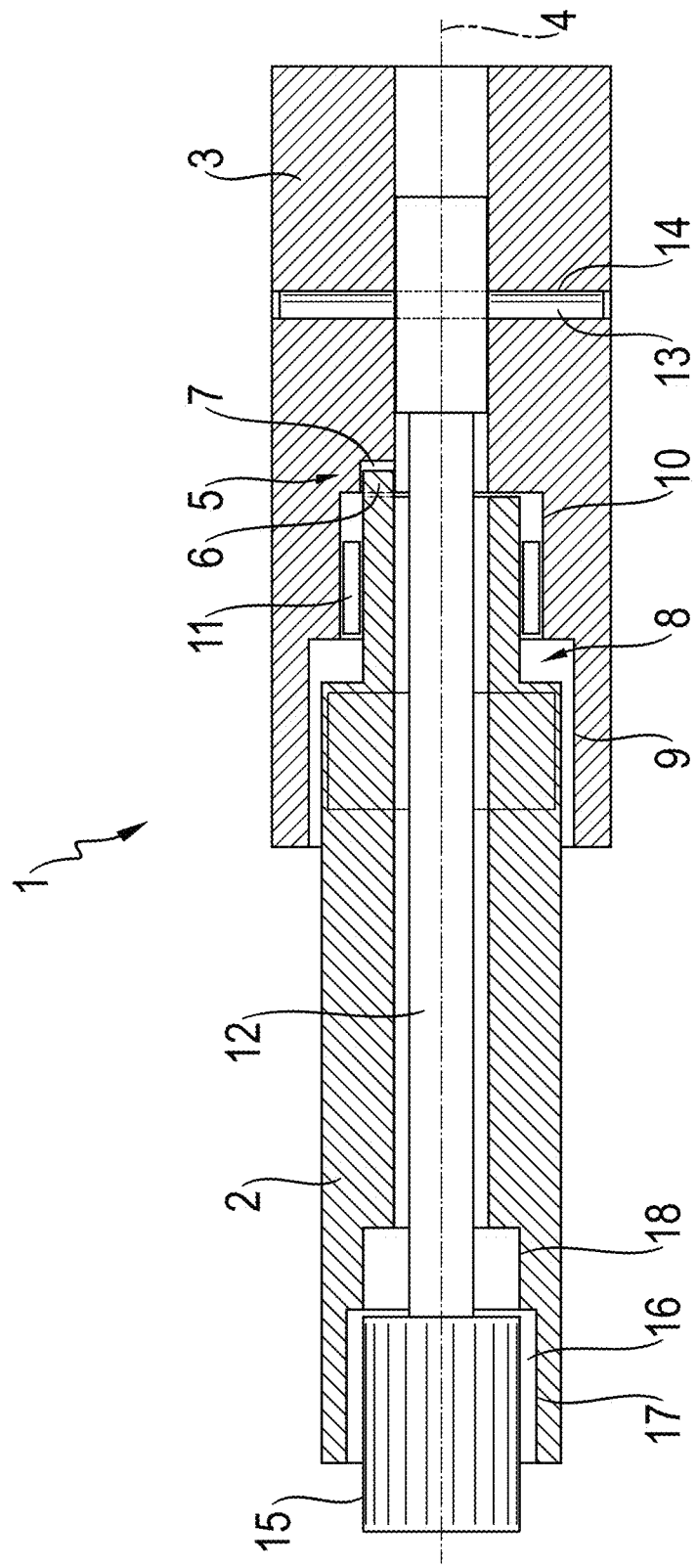

It is thus not necessary to engage in the complex process of measuring and centering the input shaft 2 and the output shaft 3 relative to one another. Instead, the coupling device 5 can be brought into engagement, thus ensuring that the desired orientation is achieved automatically. As illustrated in FIG. 3, a torsion element 12 is then inserted into the arrangement 1, in particular into the openings of the input shaft 2 and the output shaft 3. In particular, the insertion of the torsion element 12 can be performed in the coupling state. It is likewise possible for the coupling state to be adopted after the insertion of the torsion element 12. The torsion element 12 can then be connected to the input shaft 2 or the output shaft 3. Purely by way of example, FIG. 3 illustrates that the torsion element 12 is connected first to the output shaft 3, namely by means of pinning using a pin 13, which is inserted into a hole 14 in the output shaft 3 and couples the torsion element 12 to the output shaft 3.

Figure 4:
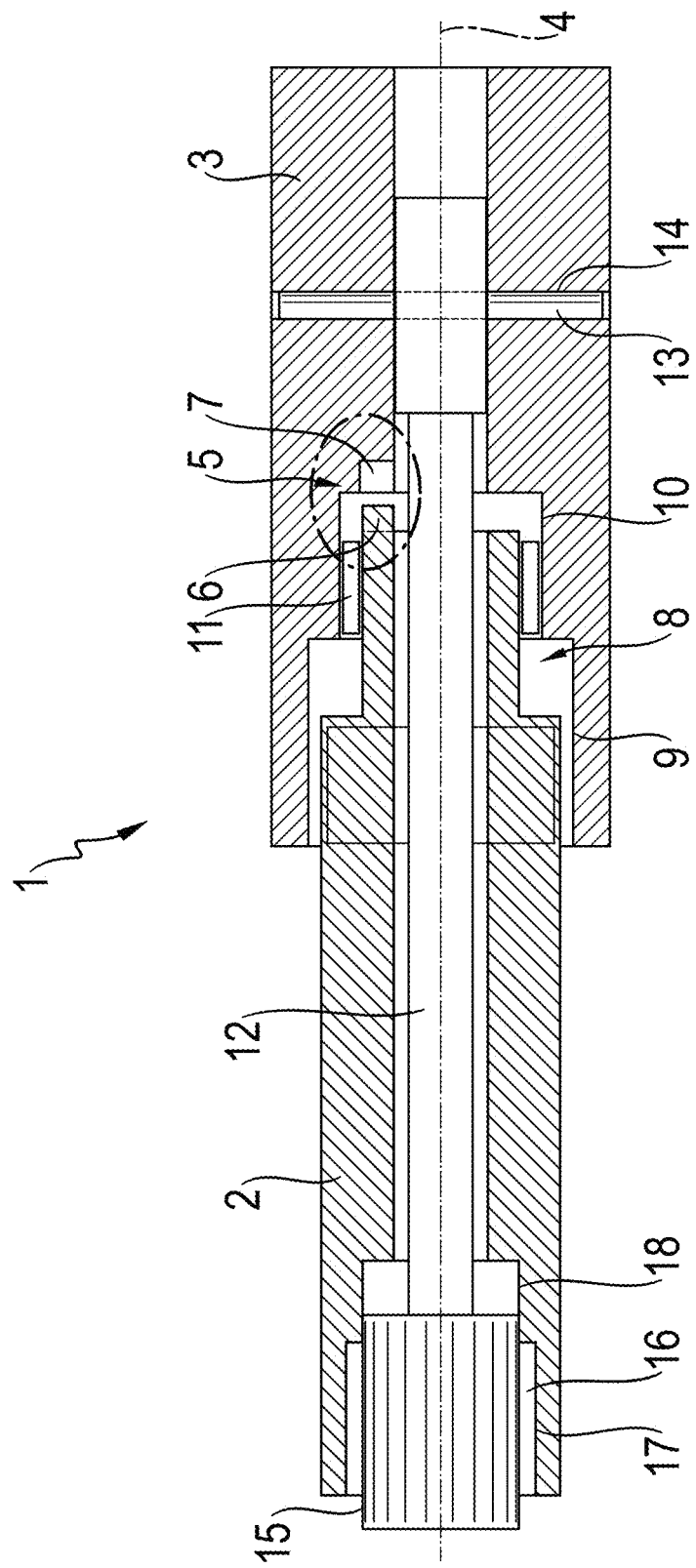

During this process, a connecting portion 15 of the torsion element 12 is arranged in a recess 16 in the input shaft 2, which recess 16 is likewise of two-stage design and has a first stage 17 and a second stage 18 of different diameters. As illustrated, the torsion element 12 rests by means of a connecting portion 15 against the second stage 18. To connect the torsion element 12 to the input shaft 2, the input shaft 2 is moved in the axial direction relative to the output shaft 3, thus releasing the coupling state. During the release of the coupling state, the connecting portion 15 engages in the second stage 18. In this exemplary embodiment, the diameters of the second stage 18 and of the connecting portion 15 of the torsion element 12 are chosen in such a way that the connecting portion 15 of the torsion element 12 is pressed into the second stage 18 of the recess 16. In particular, the connecting portion 15 has knurling for this purpose. When releasing the coupling state, a transition is made from the illustration in FIG. 3 to the illustration in FIG. 4, in which the coupling state is released and the torsion element 12 is coupled both to the input shaft 2 and to the output shaft 3. During this process, the input shaft 2 can once again be coupled relative to the output shaft 3, with the torsion element 12 being coupled to both components.

Figure 5B:
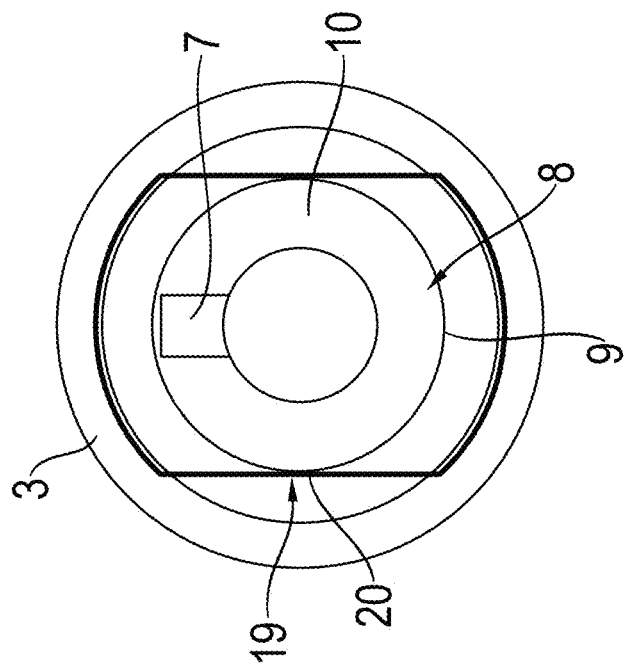
FIGS. 5a, 5b each show a detail of the arrangement in a cross section.
Figure 5A:
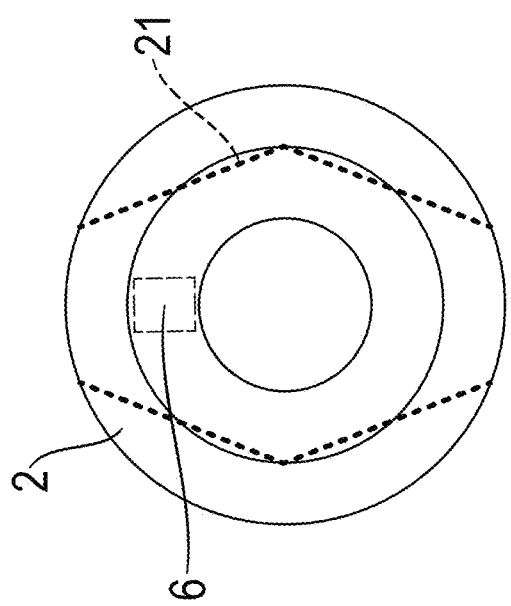

FIGS. 5a, 5b each show a cross section through the input shaft 2 (FIG. 5a) and the output shaft 3 (FIG. 5b) in the region of the coupling device 5. It is apparent that the first coupling element 6 is formed on the input shaft 2 and, corresponding to this, the second coupling element 7 is formed in the output shaft 3. The arrangement 1 furthermore has a securing device 19, which provides a contour 20 in order to form a mechanical stop. The securing device 19 thus prevents the torsion element 12 from being overloaded: for example, excessive rotation between the input shaft 2 and the output shaft 3 can be prevented.

Furthermore, the securing device 19 ensures that the arrangement 1 maintains steerability, even if the torsion element 12 is damaged, e.g. breaks. Ultimately, the securing device 19 defines a safety angle 21 through which the input shaft 2 and the output shaft 3 can be rotated to the maximum extent relative to one another. Here, the securing device 5 ensures that, in the desired orientation, the input shaft 2 and the output shaft 3 are in the center of the safety angle 21, i.e. that they can be rotated by half the safety angle 21 in both directions after the release of the coupling state.

The sequence of assembly shown can be changed as desired. In particular, it is possible to connect the torsion element 12 to the input shaft 2 first, before the connection to the output shaft 3 is established. It is likewise possible to release the coupling state before coupling to the torsion element 12 is established.

The advantages, details and features shown in the individual figures can be combined, applied to one another and interchanged in any desired manner. The arrangement 1 can be part of a steering device (not shown specifically) for a motor vehicle (not shown specifically). A motor vehicle of this kind can thus have a steering device with an arrangement 1 shown.

REFERENCE SIGNS 1 arrangement
2 input shaft
3 output shaft
4 axis of rotation
5 coupling device
6 first coupling element
7 second coupling element
8 socket
9 first socket stage
10 second socket stage
11 bearing
12 torsion element
13 pin
14 hole
15 connecting portion
16 recess
17 first stage
18 second stage
19 securing device
20 contour
21 safety angle

The invention claimed is:

1. A method for producing an arrangement (1) for a steering device, said arrangement (1) comprising an input shaft (2) and an output shaft (3) and a torsion element (12) coupling the input shaft (2) and the output shaft (3), wherein, in the assembly of the arrangement (1), a coupling state is adopted in which the input shaft (2) is rotationally coupled to the output shaft (3) in an orientation defined by a coupling device (5), and in that the coupling state is released before a rotational fixing of the torsion element (12) on the input shaft (2) and/or the output shaft (3).

2. The method as claimed in claim 1, wherein the coupling state is released after the rotational fixing of the torsion element (12) on one of the input shaft (2) and the output shaft (3) and before the rotational fixing of the torsion element (12) on the other of the output shaft (3) and the input shaft (2), or the coupling state is released before the rotational fixing of the torsion element (12) on the input shaft (2) and the output shaft (3).

3. The method as claimed in claim 1, wherein the coupling state is established and released by a relative movement between the input shaft (2) and the output shaft (3).

4. The method as claimed in claim 1, wherein the arrangement (1) has a coupling device (5), wherein the coupling state is established by means of a first coupling element (6) on the input shaft (2) and of a second coupling element (7) on the output shaft (3).

5. The method as claimed in claim 1, wherein the arrangement (1) has a securing device (19), which allows a rotary movement between the input shaft (2) and the output shaft (3) by a safety angle (21), wherein the coupling state is set in such a way that the input shaft (2) and the output shaft (3) are positioned in the center of the safety angle (21) relative to one another.

6. The method as claimed in claim 1, wherein a bearing (11) is inserted between the input shaft (2) and the output shaft (3).

7. The method as claimed in claim 1, wherein the input shaft (2) and the output shaft (3) are connected to the torsion element (12) positively or non-positively.

8. The method as claimed in claim 1, wherein the torsion element (12) is fixed in the axial direction in a two-stage recess (16) in the input shaft (2) or the output shaft (3).

9. The method as claimed in claim 6, wherein the bearing (11) is a needle bearing.

10. The method as claimed in claim 1, wherein the coupling state is released after the rotational fixing of the torsion element (12) on one of the input shaft (2) and the output shaft (3) and before the rotational fixing of the torsion element (12) on another of the input shaft (3) and the output shaft (2).

11. The method as claimed in claim 1, wherein the coupling state is released by axially moving at least one of the input shaft and the output shaft relative to the torsion element and relative to the other of the input shaft and the output shaft.

12. An arrangement (1) for a steering device, which arrangement (1) has an input shaft (2) and an output shaft (3) and a torsion element (12) coupling the input shaft (2) and the output shaft (3), wherein the arrangement (1) has a coupling device (5), which is designed, during assembly, to establish a coupling state between the input shaft (2) and the output shaft (3), in which state the input shaft (2) is rotationally coupled to the output shaft (3) in a defined orientation, and in that the coupling device (5) is designed to release the coupling state before a rotational fixing of the torsion element (12) on the input shaft (2) and/or the output shaft (3).

13. A motor vehicle comprising a steering device having an arrangement (1) as claimed in claim 12.

* * * * *